United States Patent Office

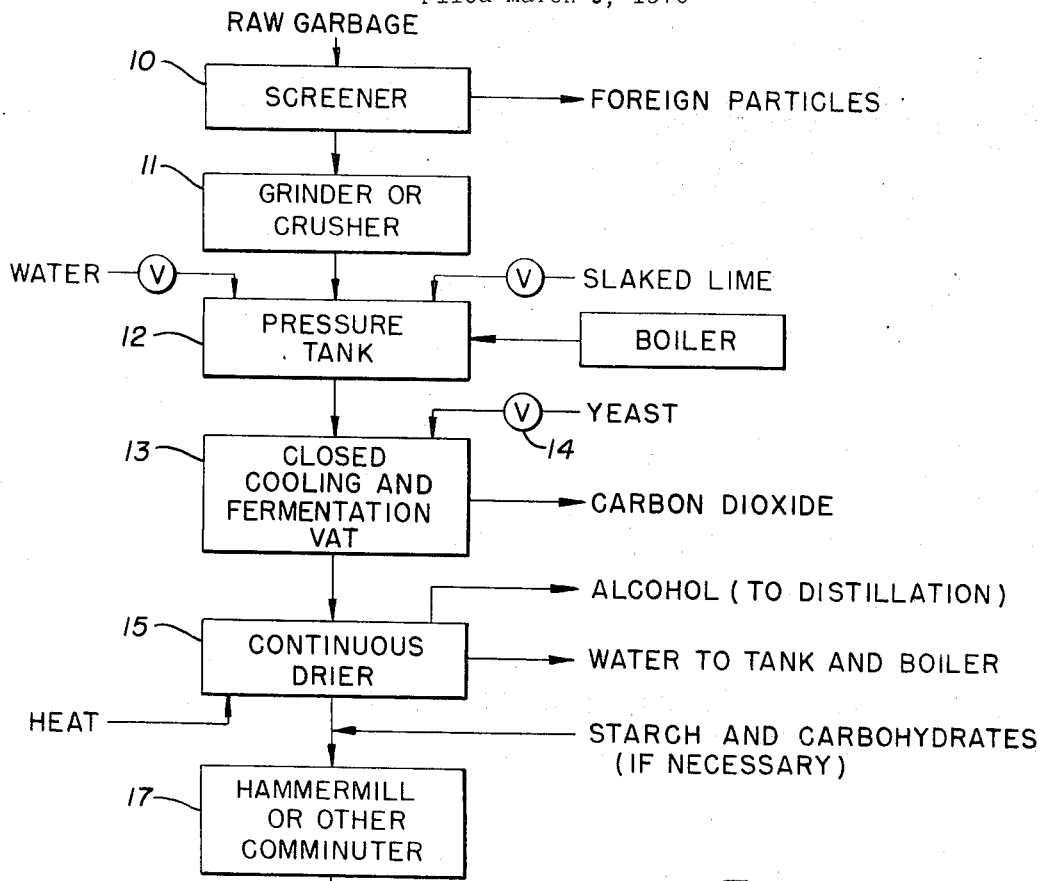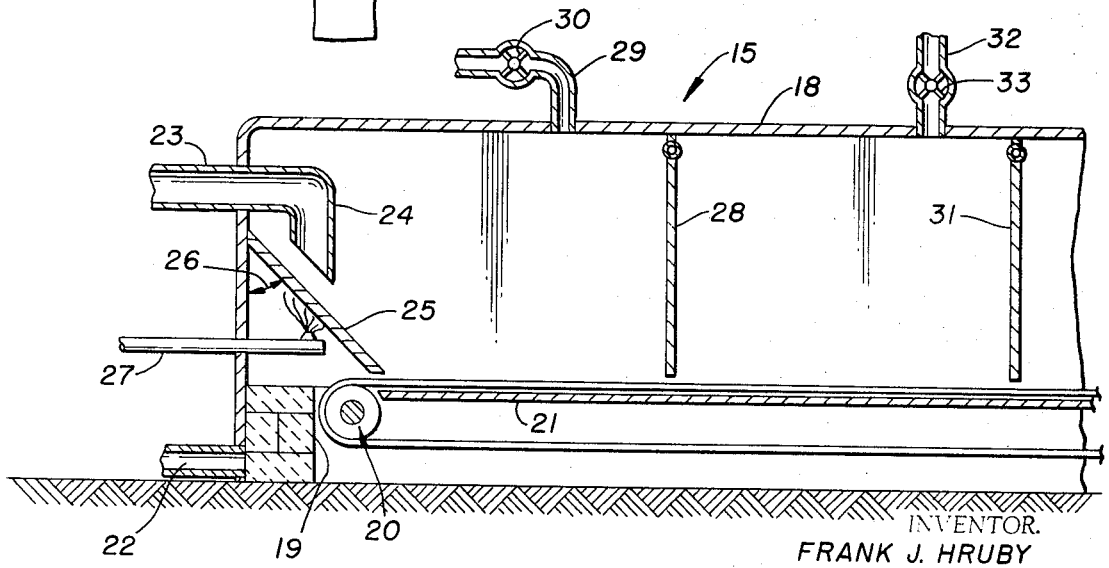

3,787,583
Patented Jan. 22, 1974

3,787,583
LIVESTOCK FEED PROCESS
Frank J. Hruby, 2809 County Road 18,
Ravenna, Ohio 44263
Continuation of abandoned application Ser. No. 500,798,
May 17, 1966. This application Mar. 9, 1970, Ser.
No. 70,763
Int. Cl. A23k 1/10, 1/06, 1/08
U.S. Cl. 426—53   2 Claims

ABSTRACT OF THE DISCLOSURE

A method for making livestock feed from a raw garbage mass by screening, grinding, pressure-cooking with steam at 15–20 p.s.i. for about two hours, closed cooling and fermenting, continuously drying while separately flashing and extracting alcohol and water vapor, and comminuting.

---

This application is a continuation of my prior application Ser. No. 500,798, filed May 17, 1966, now abandoned.

The present invention relates generally to a process or method for producing feed for livestock, poultry or other animals, utilizing waste foodstuffs as raw materials. More particularly, the present invention relates to a process for manufacturing such feed from garbage. More specifically, the present invention relates to a unique method employing a novel combination of steps to process garbage into livestock feed, while producing certain useful by-products.

Certain prior art processes have been practiced in producing livestock feed and fertilizers from various types of waste raw materials, including slaughter-house wastes, cheese manufacturing or dairy processing waste, brewing wort or seafood scraps, fish or seafood scraps, sewage, and other similar materials. However, all such methods or processes have required multiple sterilization, high pressure digestion, and other expensive and time-consuming processing operations or steps, in order that the process produce commercially acceptable livestock feed. Moreover, the feed product thus obtained still has not attained certain minimal standards required for livestock feed, in terms of protein, vitamin, starch and carbohydrate balances. Therefore, it has been necessary to augment these processed waste materials with additives or other supplemental feed materials.

Certain other prior art process concepts have contemplated employing garbage and kitchen waste as a raw material for the production of animal foods. However, these concepts have not encompassed any processing steps or operations insuring any control over the stability of contents of the resultant feed product. Therefore, these processes have not been commercially exploited to any extent, owing to the necessity for employing expensive feed material additives or fillers.

All such prior art processes, so far as applicant is aware, have required expensive and complex processing equipment, entailing inordinate initial equipment investment and incurring exorbitant maintenance and processing or production costs.

In addition to the foregoing problems, modern municipalities and urban communities have been confronted with the perplexing problem of providing adequate garbage and sewage treatment and disposal plants and facilities, without creating additional problems in terms of pollution of streams, water suppies, and the atmosphere with waste and fumes discharging or emanating from these treatment plants or facilities.

It is therefore an object of the present invention to provide an improved method or process for producing inexpensive and high quality livestock feed from garbage or waste foodstuffs.

It is a further object of the invention to furnish an improved process as aforesaid, alleviating or substantially eliminating the problems encountered in prior art methods for processing other waste materials into animal feed.

It is a still further object of the invention to provide a unique process employing a novel combination of method operations to process garbage into livestock feed having a nutrition content requiring only a minimum of augmentation with complementary or supplementary feed materials.

It is another object of the invention to provide a method for processing garbage into a useful and marketable feed product, rather than simply incinerating or treating and disposing of the same.

It is yet a further object to provide a unique garbage processing method yielding, in addition to a high quality livestock feed, certain useful and marketable by-products, including alcohol.

It is a still further object to provide improved apparatus for use in the aforesaid process, the apparatus comprising an improved combination continuous drier unit and vapor collector unit.

These and other objects and advantages of the present invention will become apparent upon reference to the detailed description in the following specification, in conjunction with the illustrations in the accompanying drawings of preferred embodiments of the present invention, it being understood that the invention is to be measured solely by the scope of the appendant claims.

In the drawings:

FIG. 1 is a schematic block diagram illustrating the sequential method steps or operation in a preferred form of the method or process according to the present invention; and FIG. 2 is a vertical or elevational partial cross-sectional view of the preferred form of the combination continuous drier and vapor collector according to the present invention.

While the process, including the specific operations or steps, and the improved apparatus for practicing the process, as described herein in detail, are preferred embodiments or modes of practice of the present invention, it will be appreciated by those skilled in the art that the principles of the invention may be applied with equal facility with only slight variations or changes in operations performed, materials, catalysts, or reactants added and their proportions, and structures or equipment employed. Such variations, changes, or substitutions of equivalent structures, equipment, operations, or materials are comprehended within the scope and spirit of the present invention.

In general, the invention pertains to a process for manufacturing livestock feed from raw garbage through sterilization by pressure cooking, extraction of useful by-products, and drying and partially comminuting the residue to a pulp product in an improved combination continuous drier and vapor collector apparatus.

Referring to the schematic block diagram of the process in FIG. 1, raw garbage is hauled or transported to the processing plant or site where it is dumped or fed onto suitable screen apparatus 10, which screens out and discards foreign particles or solids of a size greater than a predetermined mesh rating. The screener 10 may be equipped with suitable electromagnets to capture or sort out ferrometallic materials.

From the screener 10, the garbage is conveyed, preferably by belt conveyor, pneumatic conveyor, or other automatic conveyor means, to grinder or crusher equipment 11, which may be rotary mills or presses. From the grinder or crusher 11, the thus refined garbage is similarly transported by automatic conveyor to a closed pressure vessel or tank 12.

The garbage being fed into the pressure tank 12 will vary in its moisture content according to the season of the year. Therefore, it may be necessary to add water to the charge of garbage in the tank 12 in order to produce a batch of liquid or fluid consistency. Similarly, the acidity of the garbage batch will vary seasonally, although, the batch will usually be acid due to the preponderant presence of acetic acid. In any event, a sufficient quantity of slaked lime or other suitable buffering agent or neutralizing material or alkali should be metered into the pressure tank 12 to neutralize or buffer the garbage solution charge to a generally neutral state on the pH scale.

The liquified garbage charge or solution in the pressure tank 12 is then pressure cooked or heated at approximately 15 to 20 p.s.i. steam pressure, with corresponding steam temperature ranges, the preferred pressure being about 17 p.s.i. The pressure cooking proceeds for about two hours until substantially all bacteria in the substance are killed and the charge has been substantially sterilized.

Following the pressure sterilization operation in the closed pressure vessel 12, the charge is preferably conveyed to a closed cooling and fermentation vat or vessel 13, where the charge of substantially sterilized and neutralized, liquified garbage is cooled to a temperature range of 50° F. to 150° F., the preferable terminal temperature for cooling being about 95° F. At this point, a suitable amount of liquid brewer's yeast or other suitable fermentation agent is added to the charge in the closed cooling and fermentation vat 13, preferably through a saccharometer controlled or regulated valve 14.

Fermentation in vat 13 is permitted to proceed and continue until substantially all of the carbon dioxide is emitted from the fermenting batch and drawn off.

When the fermentation has substantially concluded, the batch is discharged by automatic conveyor means into a continuous drier unit or mechanism 15 with its associated vapor collector apparatus. The batch being discharged from the vat 13 is preferably sampled to determine the level of contents of starch and carbohydrates. The batch discharged from the vat 13, however, should have more than adequate portions and contents of protein, vitamins and minerals, notwithstanding seasonal variations in constituency and content of the raw garbage raw materials.

The preferred embodiment of the continuous drier and vapor collector apparatus 15 will be described in detail hereinafter. The drier apparatus preferably employs a suitable vapor flashing means by which the liquid batch of processed garbage from the vat 13 is distributed over a flashing griddle or deflector plate means and heated to about 160° F. (or the flashing point for the particular alcohol vapor resulting from the reaction), whereby the alcohol is immediately vaporized and collected in an evacuation hood through which it is conducted to standard distillation apparatus for distillation and purification.

Experimentation with the process according to the present invention has revealed that approximately eight to fourteen gallons of alcohol of suitable purity can be extracted and distilled from each ton of raw garbage processed according to this method. It has also been found that a charge of approximately one ton of liquified garbage can be processed and dried using only about one ton of coal or fuel or heating medium having the equivalent thermal content.

From the continuous drier 15 the dried batch is fed or conveyed to a hammermill or other suitable comminuter or pulverizing equipment 17. The pulpy product is then bagged or packaged manually or with suitable equipment.

Referring now to FIG. 2, the preferred form of continuous drier apparatus is designated generally by the numeral 15. The drier device is housed within a suitable enclosure 18 joining to a foundation wall 19 suitably insulated, as by fire brick, to define a heating chamber extending throughout the length of the drier 15. A conventional shaker conveyor, designated generally by the numeral 20, is mounted near the base of the drier 15, and extends for the length of the drier 15. A backing plate 21 underlies the conveying surface of the shaker conveyor 20 and extends throughout the length of the drier 15, thus cooperating with the foundation wall 19 to form a heating chamber to which heat is supplied, as through duct 22.

At the front or left hand side of the drier 15, near the top, charging pipe or conduit 23 enters to discharge liquid batches from the vat 13 into the drier. The pipe or conduit 23 has a downwardly curved discharge neck 24, opening adjacent or just above a downwardly slanted flashing or evaporation plate 25, mounted on the housing 18.

Plate 25, which may be in the form of a vaporizing grill, evaporator griddle, dispersion plate, or deflector plate is mounted onto the housing 18 and extends inwardly and downwardly into the interior of the drier 15, with the lower edge or periphery of the plate 25 being adjacent to the conveying surface of the shaker conveyor 20. The plate 25 acts as a deflecting and dispersing slide over which the liquid mixture or garbage batch is spilled onto the shaker conveyor 20. It has been found that the plate 25 should be mounted at a downward slope, angle, or attitude, designated generally by the numeral 26, of approximately 45 degrees.

Located beneath and in operative proximity to the underside of plate 25, which is preferably composed of aluminum or copper or other substance having a high heat conductivity, consistent with a high resistivity to corrosion, is a flame jet apparatus or burner 27, which heats the surface of the plate 25 to a temperature at or slightly above the flashing point of the alcohol within the refined and processed garbage mass being discharged onto the plate. This temperature should be about 160° F. Thus, upon contact with the heated plate 25, the alcohol is flashed off or evaporated into a vapor which rises by convection to the top of the housing 18. The alcohol vapor is longitudinally confined to the front or left portion of the housing 18 by a hinged baffle plate 28, suspended from the inside or the housing 18. The baffle plate 28 is preferably composed of aluminum or copper. The thus confined rising alcohol vapors are conducted or drawn off through an exhaust or evacuation duct 29 emerging from the top of the housing 18 in front or to the left of the baffle plate 28. The vapors are conducted through duct 29 to conventional distillation and purification equipment for recovery of the alcohol, exhaust being effected by suction fan 30.

Moisture being evaporated in the drying zone, longitudinally defined by a second hinged plate 31 similar to plate 28, is removed through an exhaust duct 32, by means of a suction fan 33, and is condensed and saved for the pressure tank 12 and its associated boiler.

It should therefore be apparent from the foregoing descriptions that the above-described preferred embodiments of forms of improved livestock feed processes or methods and the improved drier apparatus employed therein accomplish the several objects of the invention.

What is claimed is:

1. A process of producing livestock feed from a raw garbage mass, consisting essentially in the steps of:
   (a) first refining said garbage mass by
      (i) removing foreign, non-food, particles,
      (ii) comminuting the garbage mass;
   (b) then batch processing the garbage mass by
      (i) feeding a batch of uncooked garbage mass into a pressure tank,
      (ii) adding a neutralizer to the batch in an amount sufficient to establish a substantially neutral state of the batch,
      (iii) cooking the neutral batch in the pressure tank at pressure above atmospheric and at temperatures above 212 degrees Fahrenheit for a sufficient time to sterilize and liquify said batch,
(iv) thereafter cooling the batch to a temperature below 150 degrees Fahrenheit,
(v) adding a fermenting agent to the cooled batch, and
(vi) then fermenting the entire liquified batch until emission of carbon dioxide substantially stops;
(c) subsequently drying said fermented batch while removing alcoholic vapors; and
(d) thereafter comminuting said dried batch;
(e) said entire process being carried out while retaining the grease of the garbage mass.

2. A process of producing livestock feed from a raw garbage mass, consisting essentially in the steps of:
(a) first refining said garbage mass by
(i) removing foreign, non-food, particles,
(ii) limiting the maximum size of garbage solids that comprise said mass, and
(iii) comminuting the mass;
(b) then batch processing the garbage mass by
(i) feeding a batch of said refined mass into a pressure tank,
(ii) adding water to the batch when the batch is not fluid,
(iii) adding a neutralizer to the batch in an amount sufficient to establish a substantially neutral state of the batch,
(iv) thereafter sterilizing and liquifying the batch by cooking the batch in a closed vessel under steam at pressure of between 15 to 20 pounds per square inch gauge at temperatures between 240 and 270 degrees Fahrenheit for approximately two hours,
(v) then cooling the batch to a temperature between 50 and 150 degrees Fahrenheit,
(vi) adding a fermenting agent to the cooled batch, and
(vii) then fermenting the entire liquified batch until emission of carbon dioxide substantially stops;
(c) subsequently drying said fermented batch while removing alcoholic vapors; and
(d) thereafter comminuting said dried batch;
(e) said entire batch process being carried out while retaining the grease of the garbage mass.

References Cited
UNITED STATES PATENTS

| | | | |
|---|---|---|---|
| 1,210,250 | 12/1916 | Young | 99—149 X |
| 1,440,727 | 1/1923 | Faust | 99—149 |
| 2,112,175 | 3/1938 | Moreton | 99—149 |

RAYMOND N. JONES, Primary Examiner

U.S. Cl. X.R.

34—218; 426—59, 464, 478